UNITED STATES PATENT OFFICE.

JOHN M. ORDWAY, OF MANCHESTER, NEW HAMPSHIRE, ASSIGNOR TO CHARLES E. HODGES, OF DORCHESTER, AND NATHANIEL D. SILSBEE, OF BOSTON, MASSACHUSETTS.

IMPROVEMENT IN PREPARING HYDRATED SILICATES OF POTASH AND SODA.

Specification forming part of Letters Patent No. 38,449, dated May 5, 1863.

*To all whom it may concern:*

Be it known that I, JOHN M. ORDWAY, a citizen of the United States of America, and a resident of Manchester, in the county of Hillsborough and State of New Hampshire, have made a new and useful invention having reference to the reduction of hydrated water-glass to the form of a hard pulverizable solid soluble in cold water; and I hereby declare that the following is a full and exact description of my said invention, the nature of which consists in precipitating water-glass from its solution by means of some neutral salt of soda or potash and in freeing the precipitate from adhering mother-liquor by strong pressure, the pressed coagulum being subsequently further dried by exposure to warm air.

To enable others skilled in the art to use my invention, I will proceed to describe the method of operating.

I take a strong solution of water-glass—or, in other words, of a highly silicious soluble silicate of soda or potash—and pour into it, with constant stirring, about an equal bulk of a strong solution of chloride of sodium or some other neutral salt of soda or potash, and let the mixture rest for several hours. I then collect the contracted precipitate in a cloth and subject it to the action of a powerful press, whereby nearly all the adhering mother-liquor will be removed and the silicate will be condensed to a solid cake. I afterward break up this cake and keep it in a warm place until it loses about one-fifth of its weight and becomes capable of being ground to an incoherent powder.

In carrying out this process I prefer to use a water-glass solution containing at least twenty-five per cent. of its weight of dry silicate, and I generally employ as a precipitant a nearly-saturated solution of common salt; but it is not essential that the solutions should be of any particular strength, though the stronger they are the more complete will be the precipitation. Moreover, chloride of potassium, acetate of potash, acetate of soda, nitrate of potash, nitrate of soda, and several other neutral salts of potash or soda may be substituted for chloride of sodium. It is not essential that the water-glass should be of any special composition; but it should contain, by chemical analysis, for one hundred parts, by weight, of silica between twenty-three and thirty-four parts, by weight, of potash. I also sometimes take the well-known soft precipitate obtained from water-glass by means of alcohol and solidify the same by pressure and subsequent drying.

I am aware that the original discoverer of water-glass proposed to purify and solidify the silicate by precipitation with alcohol; but the product so obtained is a soft solid unsuitable for packing and transportation, and is difficult to be dried on a large scale unless it be first condensed by pressure, and the plan of precipitating by alcohol is of little practical value without this subsequent treatment, of which I have found it capable.

I claim as my invention—

1. The process, substantially as described, of producing a solid hydrated alkaline silicate, the same consisting in treating a solution of a silicate by precipitating the silicate and subsequently pressing and drying it, substantially as specified.

2. The application of chloride of sodium or a neutral alkaline salt to a solution of an alkaline silicate as a means of effecting precipitation of the mineral matter of the solution.

JOHN M. ORDWAY.

Witnesses:
R. H. CADY,
F. P. HALE, Jr.